United States Patent
Duffy et al.

(10) Patent No.: US 6,843,231 B1
(45) Date of Patent: Jan. 18, 2005

(54) CYLINDER TO CYLINDER BALANCING USING INTAKE VALVE ACTUATION

(75) Inventors: Kevin P. Duffy, East Peoria, IL (US); Andrew J. Kieser, Morton, IL (US); Jonathan P. Kilkenny, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/742,544

(22) Filed: Dec. 19, 2003

(51) Int. Cl.[7] .............................................. F02M 7/00
(52) U.S. Cl. .................................................... 123/435
(58) Field of Search ............................. 123/435, 90.1, 123/90.11

(56) References Cited

U.S. PATENT DOCUMENTS

| | | | |
|---|---|---|---|
| 4,350,129 A | * | 9/1982 | Nakajima et al. ............ 123/310 |
| 4,760,830 A | | 8/1988 | Bullis et al. |
| 5,103,789 A | | 4/1992 | Hartman et al. |
| 5,765,532 A | | 6/1998 | Loye |
| 5,941,213 A | | 8/1999 | Ishii et al. |
| 6,158,418 A | | 12/2000 | Brown et al. |
| 6,276,334 B1 | | 8/2001 | Flynn et al. |
| 6,286,482 B1 | | 9/2001 | Flynn et al. |
| 6,354,268 B1 | | 3/2002 | Beck et al. |
| 6,480,781 B1 | | 11/2002 | Hafner et al. |
| 6,561,157 B2 | | 5/2003 | zur Loye et al. |
| 6,612,294 B2 | * | 9/2003 | Hiraya et al. .......... 123/568.14 |
| 6,691,022 B2 | * | 2/2004 | Takemura et al. .......... 701/109 |
| 2002/0177939 A1 | | 11/2002 | Kabasin |
| 2003/0010101 A1 | | 1/2003 | Zur Loye et al. |

* cited by examiner

*Primary Examiner*—John T. Kwon
(74) *Attorney, Agent, or Firm*—Steve D Lundquist

(57) ABSTRACT

A method and apparatus for balancing a combustion phasing between a plurality of cylinders located in an engine. The method and apparatus includes a determining a combustion timing in each cylinder, establishing a baseline parameter for a desired combustion timing, and varying actuation of at least one of a plurality of intake valves, each intake valve being in fluid communication with a corresponding cylinder, such that the combustion timing in each cylinder is substantially equal to the desired combustion timing.

20 Claims, 5 Drawing Sheets

CYLINDER TO CYLINDER BALANCING USING INTAKE VALVE ACTUATION

This invention was made with Government support under DOE Contract No. DE-FC05-00OR22806; awarded by the U.S. Department of Energy. The Government has certain rights to this invention.

TECHNICAL FIELD

This invention relates generally to a method and apparatus for balancing the combustion process in individual cylinders in an internal combustion engine and, more particularly, to a method and apparatus for cylinder to cylinder balancing using variable intake valve actuation for each cylinder.

BACKGROUND

It has long been desired to operate internal combustion engines, in particular engines with multiple combustion cylinders, in a manner which results in optimal performance with minimal emissions. This goal, however, is difficult to achieve. One contributing factor is the lack of uniform combustion characteristics from cylinder to cylinder. Variables such as air mass, temperature and pressure imbalances contribute to this non-uniformity. The problem may be made worse by the use of intake valve actuation techniques, such as Miller cycle, which may induce a backflow of air from cylinders into input ports. The result may include differences in peak cylinder pressure, rise rates and emissions from each cylinder, caused by non-uniform combustion phasing among the cylinders.

Efforts to improve performance and emissions characteristics of internal combustion engines have shown promise with the development of homogeneous charge compression ignition (HCCI) techniques. However, the variations in combustion phasing between cylinders, caused by the above variables, poses a significant obstacle to making HCCI engines a viable low emissions technology.

Attempts have been made to "tune" cylinder to cylinder variations in an engine. For example, in U.S. Pat. No. 6,276,334, Flynn et al. describe a method which adjusts the timing of exhaust valves to minimize cylinder to cylinder variations. The method adjusts the start of combustion timing for each cylinder, thus enabling the cylinders to combust at substantially the same time relative to each other. However, by varying the timing of the exhaust valves, the temperature within each cylinder increases, which in turn may lead to higher emissions being generated. Furthermore, when Miller cycle is being used, varying the timing of the exhaust valves does not directly address the non-uniformities being created by the variable intake valve timing process.

The present invention is directed to overcoming one or more of the problems as set forth above.

SUMMARY OF THE INVENTION

In one aspect of the present invention a method for adjusting a combustion timing of a cylinder in an engine is disclosed. The method includes the steps of determining a pressure variation in the cylinder, and varying actuation of an intake valve fluidly communicated to the cylinder until the pressure variation is a desired pressure variation, the desired pressure variation being indicative of a desired combustion timing.

In another aspect of the present invention a method for adjusting a combustion timing of a first cylinder in an engine relative to a second cylinder in the engine is disclosed. The method includes the steps of determining a first parameter indicative of a combustion pressure in the first cylinder, determining a second parameter indicative of a combustion pressure in the second cylinder, and varying actuation of at least one of a first intake valve and a second intake valve associated with respective first and second cylinders until the first and second parameters are substantially equal.

In another aspect of the present invention a method for adjusting a combustion timing of each of a plurality of cylinders in an engine, each cylinder having a respective intake valve, is disclosed. The method includes the steps of determining a plurality of parameters indicative of respective combustion pressures in each cylinder, and varying actuation of at least one of the intake valves until all of the plurality of parameters have substantially equal values.

In another aspect of the present invention an apparatus for adjusting a combustion timing of each of a plurality of cylinders located in an engine is disclosed. The apparatus includes a plurality of intake valves, each intake valve in fluid communication with a corresponding one of the plurality of cylinders and being independently actuable, means for determining a plurality of parameters, each parameter being indicative of a combustion pressure in each respective cylinder, and a controller for receiving signals associated with the plurality of parameters and responsively varying actuation of at least one of the intake valves until all of the plurality of parameters have substantially equal values.

In another aspect of the present invention a method for balancing a combustion phasing between a plurality of cylinders located in an engine is disclosed. The method includes the steps of determining a combustion timing in each cylinder, establishing a baseline parameter for a desired combustion timing, and varying actuation of at least one of a plurality of intake valves, each intake valve being in fluid communication with a corresponding cylinder, such that the combustion timing in each cylinder is substantially equal to the desired combustion timing.

In another aspect of the present invention a method for balancing a combustion phasing between a plurality of cylinders located in an engine is disclosed. The method includes the steps of determining a combustion timing in each cylinder, calculating a heat release rate in each cylinder as a function of the combustion timing, establishing a baseline parameter for at least one of a desired combustion timing and a desired heat release rate, and varying actuation of at least one of a plurality of intake valves, each intake valve being in fluid communication with a corresponding cylinder, such that at least one of the combustion timing and the heat release rate in each cylinder is substantially equal to a corresponding at least one of the desired combustion timing and the desired heat release rate.

DETAILED DESCRIPTION

Figure 1:
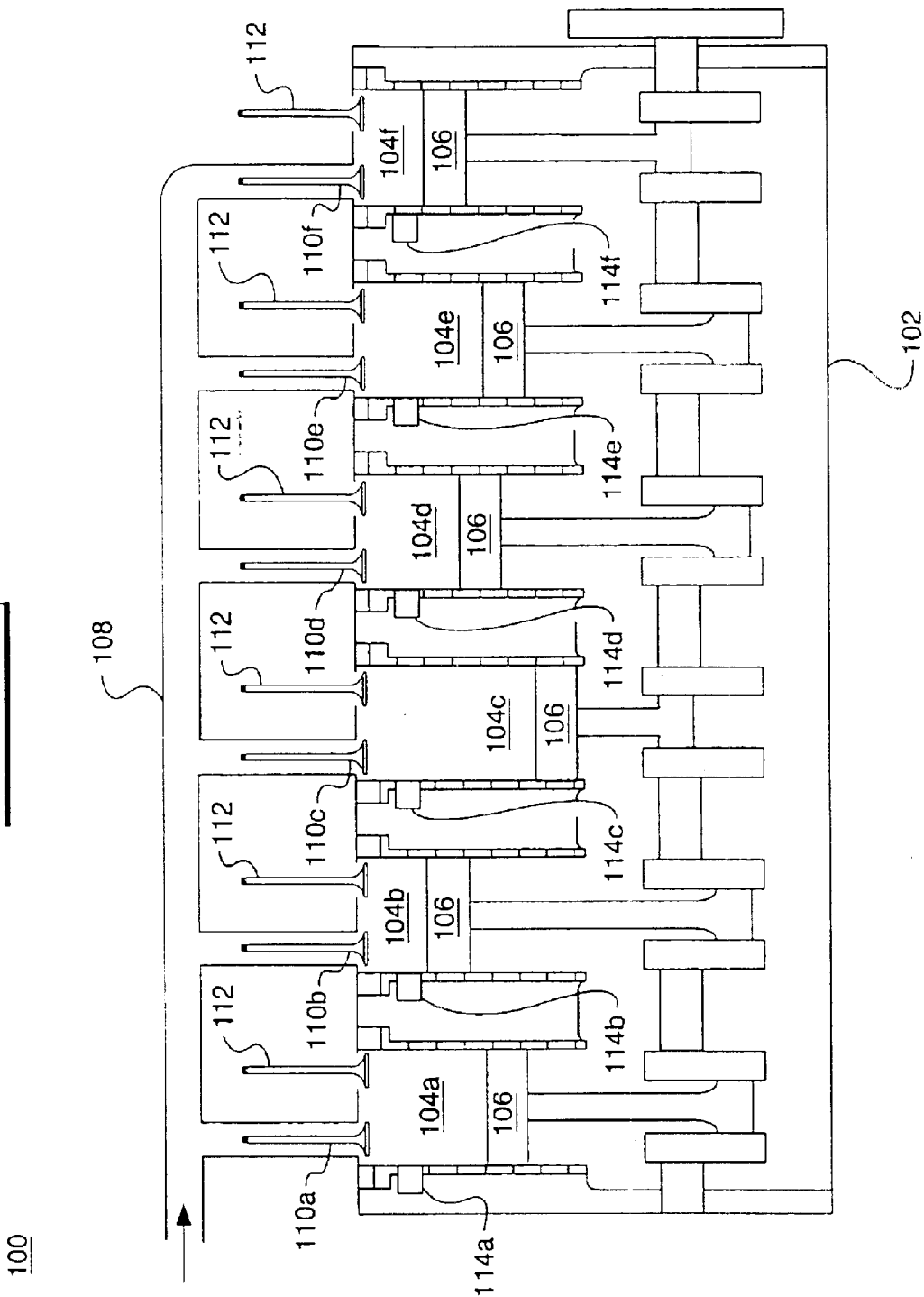
FIG. 1 is a diagrammatic illustration of an engine suited for use with the present invention.

Referring to the drawings, a method and apparatus 100 for adjusting a combustion timing of cylinders 104 in an engine 102 is shown. More specifically, a method and apparatus 100 for balancing a combustion phasing between a plurality of cylinders 104 located in an engine 102 is shown.

Referring to FIG. 1, a diagrammatic illustration of an engine 102, i.e., an internal combustion engine, is shown. The engine 102 includes a number of combustion cylinders 104, within which a corresponding number of pistons 106 are located which slidably move in the cylinders 104, as is well known in the art. FIG. 1 depicts six (6) cylinders 104a,b,c,d,e,f. However, the engine 102 may have any number of cylinders 104 for operation.

An intake manifold 108 connects to each cylinder 104 and provides a path for an intake fluid, such as fresh air, into each cylinder 104. Fluid communication of the air is controlled per cylinder by intake valves 110. For example, the engine 102 of FIG. 1 has six (6) intake valves 110a,b,c,d,e,f for control of intake air into each of corresponding cylinders 104a,b,c,d,e,f. Operation and control of the intake valves 110 is described in more detail below.

Exhaust valves 112 are also located in the engine 102 to provide fluid communication from the cylinders 104 outward through an exhaust manifold (not shown).

Cylinder pressure sensors 114 may be used to sense pressure within each cylinder 104. For example, cylinders 104a,b,c,d,e,f may each have a corresponding cylinder pressure sensor 114a,b,c,d,e,f. Cylinder pressure sensors are typically used to monitor the pressure within cylinders for determination of the occurrence of combustion events, i.e., when a sharp rise in cylinder pressure indicates that combustion has occurred. Information such as pressure rise rate, magnitude and timing of combustion may be determined. Examples of pressure sensors suited for this application include piezo sensors, strain gauges, and the like. It is noted that FIG. 1 depicts a cylinder pressure sensor 114 for each cylinder 104. Alternatively, however, a fewer number of cylinder pressure sensors 114 than the number of cylinders 104 may be used to sense pressure directly, and information relating to pressure in the remaining cylinders 104 may be derived from a knowledge of uniform distribution of parameters such as heat among cylinders.

Figure 2:
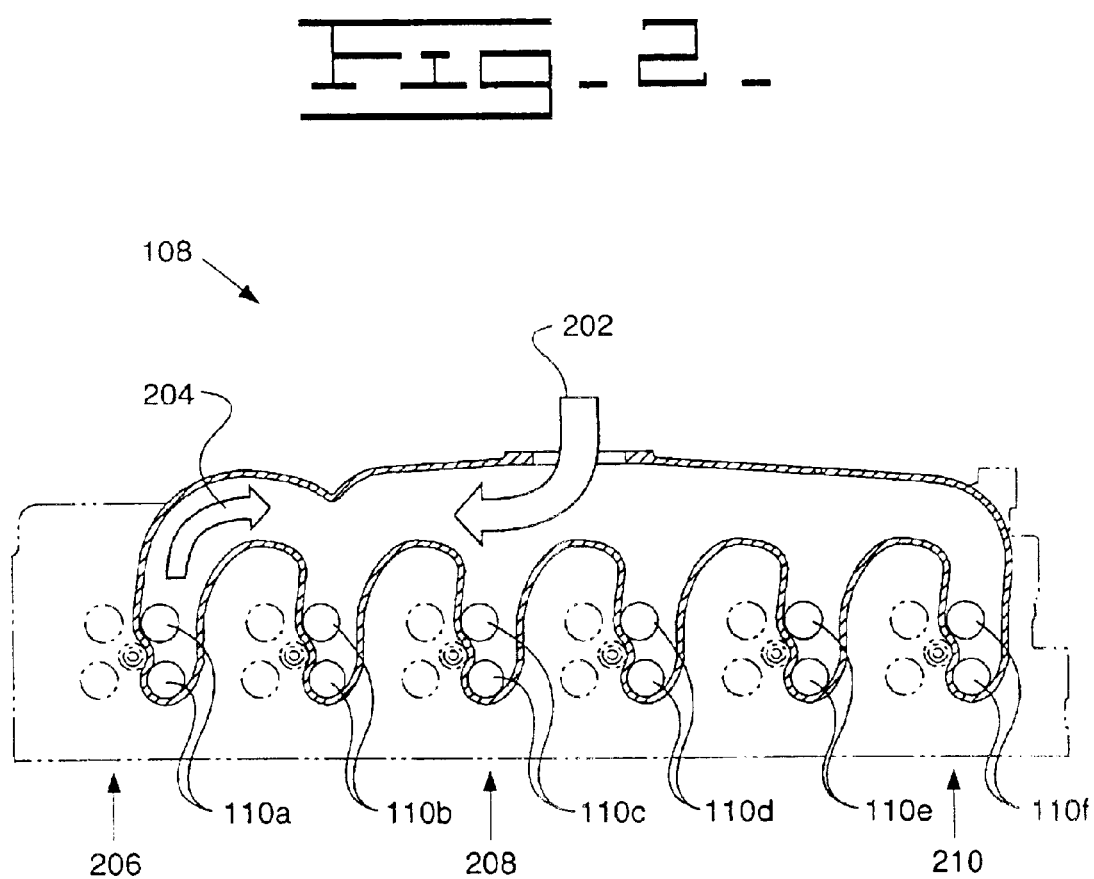
FIG. 2 is a diagrammatic illustration of an intake manifold of the engine of FIG. 1.

Referring to FIG. 2, a diagrammatic illustration of an intake manifold 108 is shown. The intake manifold 108 has an air inlet depicted by arrow 202. The intake manifold 108 also may have back flow of air, shown as arrow 204. The back flow of air may result from several factors. For example, in an engine using Miller cycle variable intake valve actuation, the use of Miller cycle may result in back flows and back pressures throughout various portions of the intake manifold 108. Back pressures may also result from differences in shape and length of portions of the intake manifold 108 which provide air to individual cylinders 104.

The intake manifold 108 may also have variable temperature distribution throughout. For example, a first temperature region 206 may have a different temperature during operation than a second temperature region 208, which in turn may have a different temperature than a third temperature region 210; that is, the second temperature region 208 may operate at cooler temperatures than the first and second temperature regions 206, 210. This non-uniform temperature distribution may be caused by factors such as the temperature of the fresh air entering the intake manifold 108, and the physical location of the various intake manifold regions with respect to the engine 102.

The non-uniformities of air flow, pressure and temperature described above results in combustion events in the cylinders 104 operating out of phase with respect to each other. This is more notable with compression ignition engines, and more notable still with homogeneous charge compression ignition (HCCI) engines. The combustion phase differences among the cylinders 104 may result in increased emissions and reduced efficiency.

Figure 3:
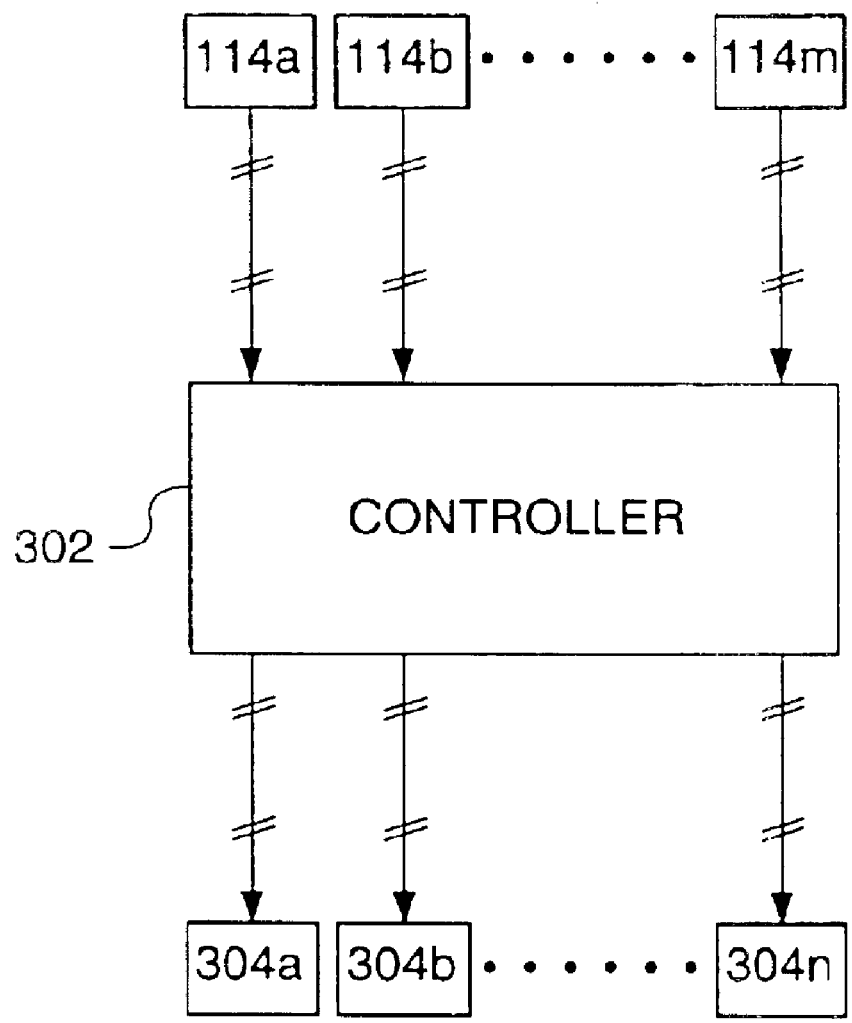
FIG. 3 is a block diagram illustrating an embodiment of the present invention.

Referring to FIG. 3, a block diagram illustrating an embodiment of the present invention is shown. A controller 302 receives pressure signals from cylinder pressure sensors 114. The controller 302 may then use this information to control actuation of intake valve actuators 304 in accord with the present invention, as described in more detail below.

The intake valve actuators 304 may be of a type known in the art, such as electro-hydraulic, electric, mechanical, and the like. For example, the intake valve actuators 304 may be electro-hydraulic actuators which serve to hold intake valves open for a period of time longer than normal cam actuation, thus extending an open duration of intake valves. Alternatively, the intake valve actuators 304 may be camless, e.g., fully electric or electro-hydraulic, thus enabling full control of intake valve actuation. With this configuration, intake valves may be opened early or closed late or both, thus allowing greater control over intake valve actuation. It is noted that the number of cylinder pressure sensors 114 need not equal the number of intake valve actuators 304 since, as described above, it is possible to directly sense combustion pressure in a select number of cylinders 104 and derive combustion data for the remaining cylinders 104 based on uniform distribution characteristics among the cylinders 104.

INDUSTRIAL APPLICABILITY

Figure 4:
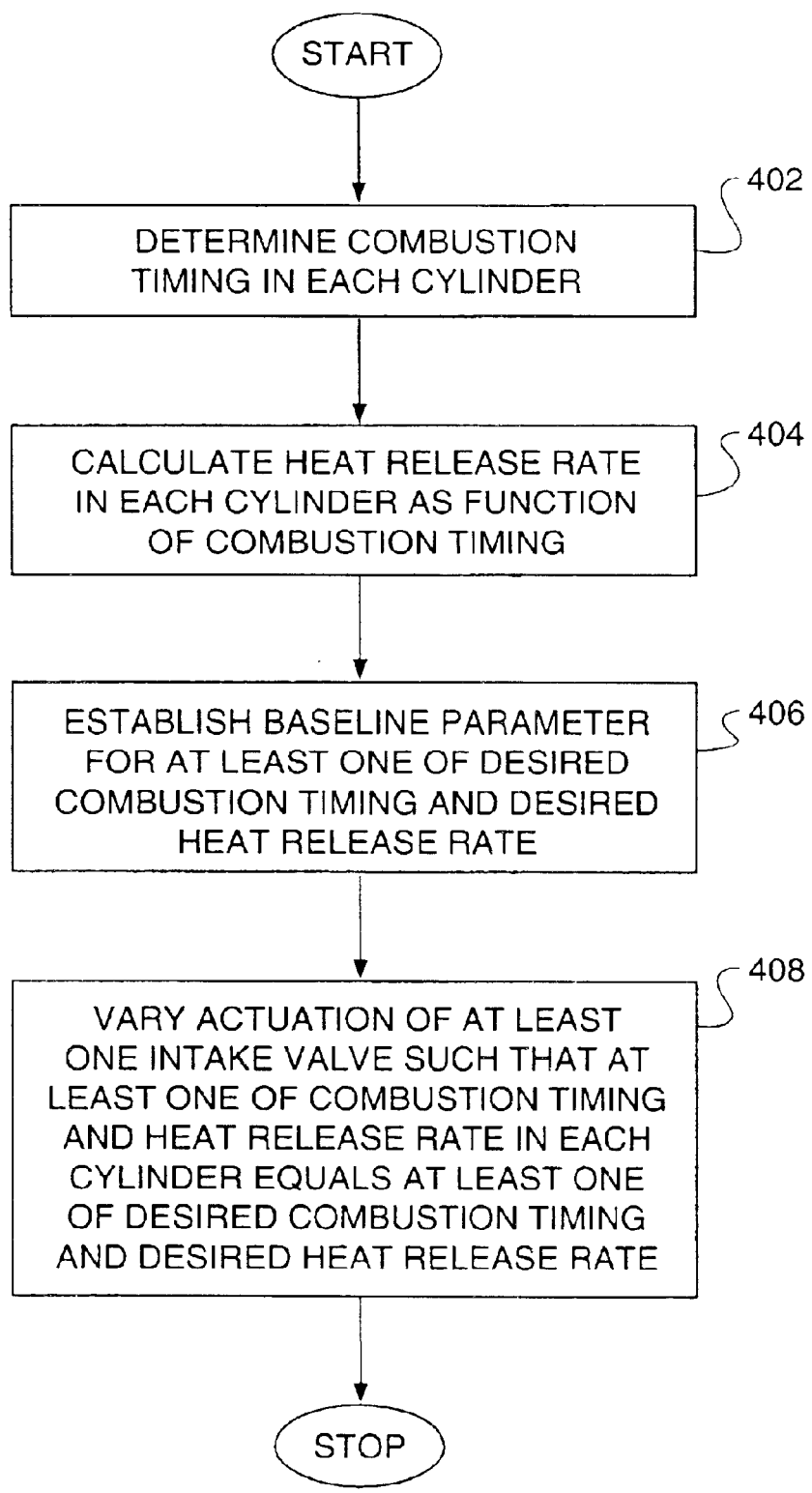
FIG. 4 is a flow diagram illustrating a method of the present invention.

With reference to the flow diagram of FIG. 4, operation of the present invention is shown.

In a first control block 402, a combustion timing in each cylinder 104 is determined. The combustion timing may be determined by sensing an increase in pressure in the cylinder 104 caused by a combustion event occurring. The combustion timing may be determined in crank angle degrees, as is well known in the art.

In a second control block 404, a heat release rate for each cylinder 104 may be calculated as a function of the determined combustion timing. For example, heat release may be calculated as a first derivative of cylinder pressure.

In a third control block 406, a baseline parameter may be established for at least one of a desired combustion timing and a desired heat release rate. The baseline parameter may be a combustion timing or heat release rate of one of the cylinders 104 to provide a measure for comparison of the remaining cylinders 104. Alternatively, the baseline parameter may be a combustion timing value or heat release rate value which is determined to closely represent ideal values, thus providing a standard of measure for all of the cylinders 104.

In a fourth control block 408, actuation of at least one intake valve 110 is varied such that at least one of the combustion timing and heat release rate in each cylinder 104 equals a corresponding at least one of the desired combustion timing and the desired heat release rate. More specifically, the open duration of one or more intake valves 110 are varied so that at least one of the combustion timing and the heat release rate for all of the cylinders 104 are substantially equal.

Figure 5:
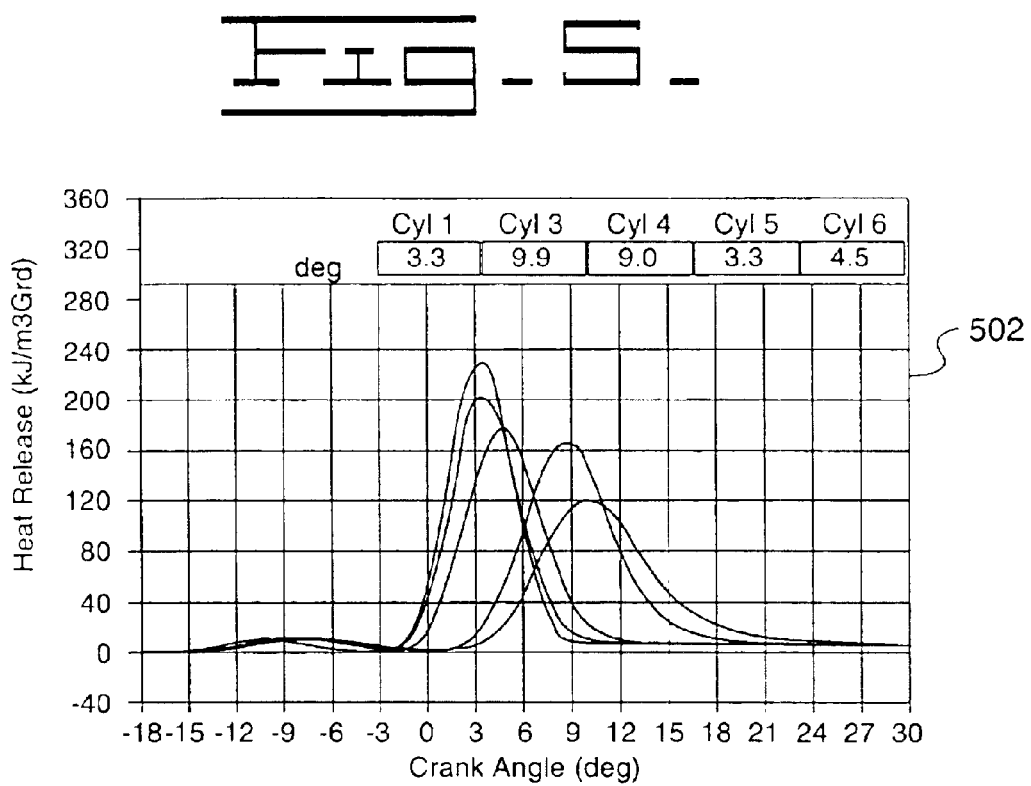
FIG. 5 is a graph of exemplary heat release rates before implementation of the present invention.
Figure 6:
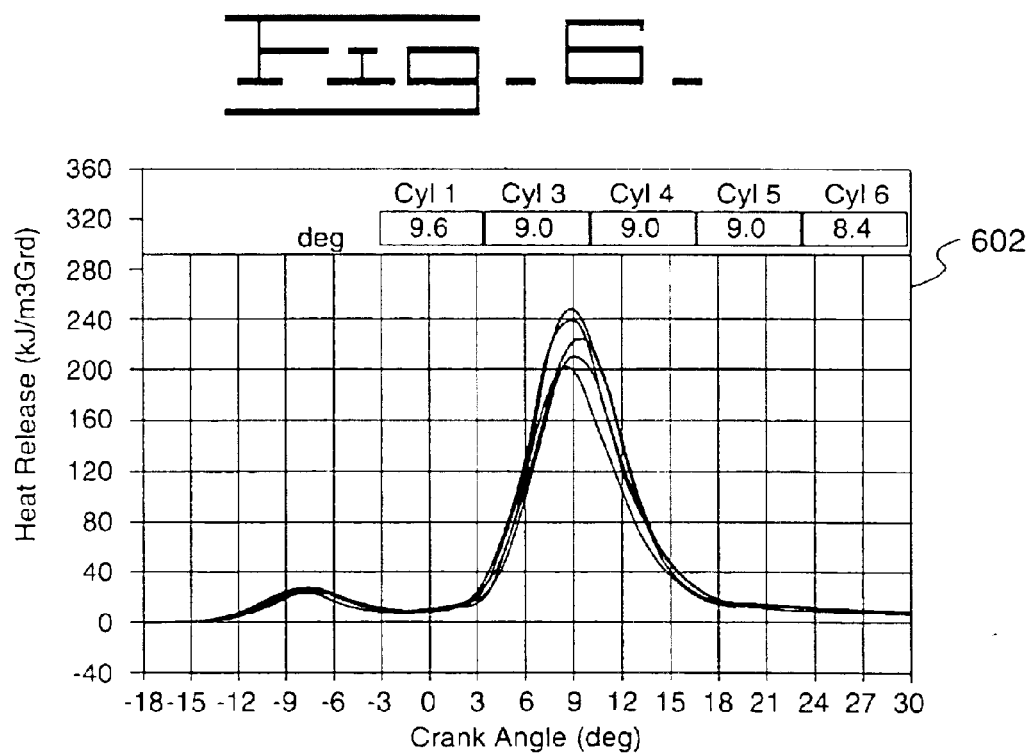
FIG. 6 is a graph of exemplary heat release rates after implementation of the present invention.

As an example of application of the present invention, reference is made to FIGS. 5 and 6. FIG. 5 shows a graph 502 of heat release rates for multiple cylinders 104 in an engine 102 before intake valve actuation of the present invention is applied. As can be seen, the heat release rates for the cylinders 104 varies by a significant amount. Principal causes for this include variations in air mass, temperature and pressure among the cylinders 104.

FIG. 6 shows a graph 602 of heat release rates for the cylinders 104 after application of the present invention. The graph 602 indicates that the heat release rate for cylinder 4 was selected as a baseline, and that the intake valves 110 of the remaining cylinders 104 were varied in open duration until the heat release rates for the remaining cylinders 104 were substantially the same as cylinder 4.

The present invention may be used to calibrate operation of the cylinders 104 initially and create maps which may then be used to maintain balanced operation among the cylinders 104. The present invention may also be used to periodically update, e.g., in real time, cylinder to cylinder balancing to compensate for changing conditions associated with the engine 102.

Other aspects can be obtained from a study of the drawings, the disclosure, and the appended claims.

What is claimed is:

1. A method for adjusting a combustion timing of a cylinder in an engine, comprising the steps of:
   determining a pressure variation in the cylinder; and
   varying actuation of an intake valve fluidly communicated to the cylinder until the pressure variation is a desired pressure variation, the desired pressure variation being indicative of a desired combustion timing.

2. A method, as set forth in claim 1, wherein the engine includes a plurality of cylinders, and further including the steps of:
   determining a pressure variation in each cylinder; and
   varying actuation of each of a plurality of intake valves fluidly communicated to a corresponding cylinder until the pressure variation of each cylinder is a desired pressure variation.

3. A method, as set forth in claim 2, wherein varying actuation of each of a plurality of intake valves includes the step of varying an open duration of each of the plurality of intake valves.

4. A method, as set forth in claim 2, further including the step of determining a heat release variation from each corresponding pressure variation.

5. A method, as set forth in claim 4, further including the step of varying actuation of at least one of the plurality of intake valves until the heat release variation of a corresponding at least one cylinder is a desired heat release variation.

6. A method, as set forth in claim 2, wherein determining a pressure variation includes the step of sensing a pressure in at least one cylinder.

7. A method, as set forth in claim 6, wherein determining a pressure variation includes the steps of:
   sensing a pressure in at least one cylinder; and
   calculating a pressure in at least one other cylinder.

8. A method for adjusting a combustion timing of a first cylinder in an engine relative to a second cylinder in the engine, comprising the steps of:
   determining a first parameter indicative of a combustion pressure in the first cylinder;
   determining a second parameter indicative of a combustion pressure in the second cylinder; and
   varying actuation of at least one of a first intake valve and a second intake valve associated with respective first and second cylinders until the first and second parameters are substantially equal.

9. A method for adjusting a combustion timing of each of a plurality of cylinders in an engine, each cylinder having a respective intake valve, comprising the steps of;
   determining a plurality of parameters indicative of respective combustion pressures in each cylinder; and
   varying actuation of at least one of the intake valves until all of the plurality of parameters have substantially equal values.

10. A method, as set forth in claim 9, further including the steps of:
    establishing a baseline parameter as a function of the determined plurality of parameters; and
    varying actuation of at least one of the intake valves until all of the plurality of parameters are substantially equal to the baseline parameter.

11. A method, as set forth in claim 10, wherein varying actuation of at least one of the intake valves includes the step of varying an open duration of at least one of the intake valves.

12. An apparatus for adjusting a combustion timing of each of a plurality of cylinders located in an engine, comprising:
    a plurality of intake valves, each intake valve in fluid communication with a corresponding one of the plurality of cylinders and being independently actuable;
    means for determining a plurality of parameters, each parameter being indicative of a combustion pressure in each respective cylinder; and
    a controller for receiving signals associated with the plurality of parameters and responsively varying actuation of at least one of the intake valves until all of the plurality of parameters have substantially equal values.

13. An apparatus, as set forth in claim 12, wherein the means for determining a plurality of parameters includes at least one cylinder pressure sensor.

14. An apparatus, as set forth in claim 13, wherein the means for determining a plurality of parameters includes a plurality of cylinder pressure sensors, each of the cylinder pressure sensors being associated with a corresponding one of the plurality of cylinders.

15. A method for balancing a combustion phasing between a plurality of cylinders located in an engine, comprising the steps of:
    determining a combustion timing in each cylinder;
    establishing a baseline parameter for a desired combustion timing; and
    varying actuation of at least one of a plurality of intake valves, each intake valve being in fluid communication with a corresponding cylinder, such that the combustion timing in each cylinder is substantially equal to the desired combustion timing.

16. A method, as set forth in claim 15, wherein determining a combustion timing in each cylinder includes the step of sensing a combustion timing in each cylinder.

17. A method, as set forth in claim 16, wherein sensing a combustion timing in each cylinder includes the step of sensing a pressure variation in each cylinder.

18. A method, as set forth in claim 15, wherein determining a combustion timing in each cylinder includes the steps of:
    sensing a combustion timing in at least one cylinder; and calculating a combustion timing in at least one other cylinder as a function of the sensed combustion timing.

19. A method, as set forth in claim 15, wherein varying actuation of at least one of a plurality of intake valves includes the step of varying an open duration of at least one of a plurality of intake valves.

20. A method for balancing a combustion phasing between a plurality of cylinders located in an engine, comprising the steps of:

determining a combustion timing in each cylinder;

calculating a heat release rate in each cylinder as a function of the combustion timing;

establishing a baseline parameter for at least one of a desired combustion timing and a desired heat release rate; and varying actuation of at least one of a plurality of intake valves, each intake valve being in fluid communication with a corresponding cylinder, such that at least one of the combustion timing and the heat release rate in each cylinder is substantially equal to a corresponding at least one of the desired combustion timing and the desired heat release rate.

* * * * *